Figure 1:
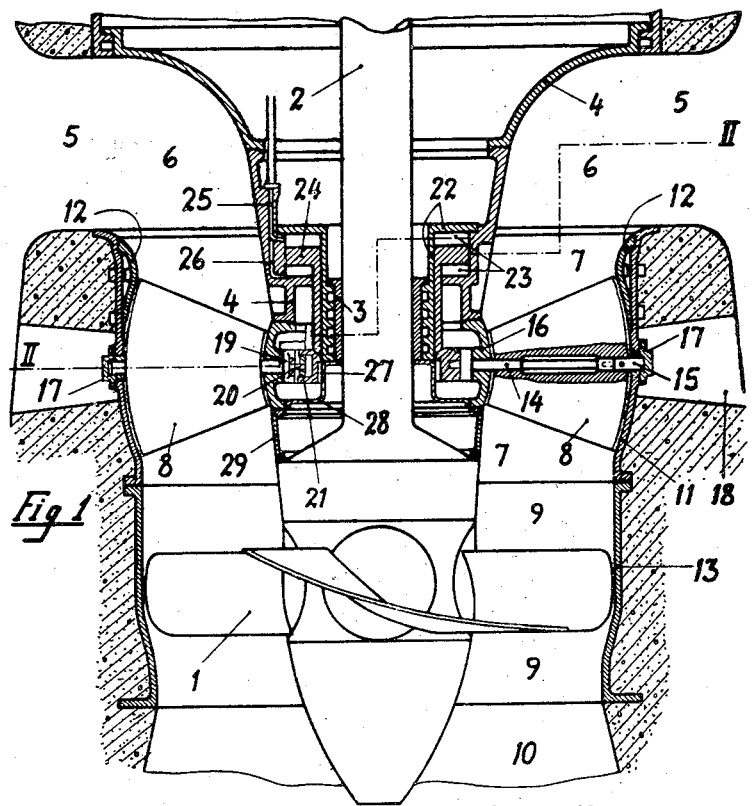

Nov. 4, 1952     O. E. ALM     2,616,663

WATER TURBINE AND PROPELLER PUMP

Filed June 8, 1946     3 Sheets—Sheet 1

Inventor:
Oscar Emanuel Alm.
by: W. Bayard Jones
Attorney.

Nov. 4, 1952     O. E. ALM     2,616,663
WATER TURBINE AND PROPELLER PUMP
Filed June 8, 1946     3 Sheets-Sheet 2
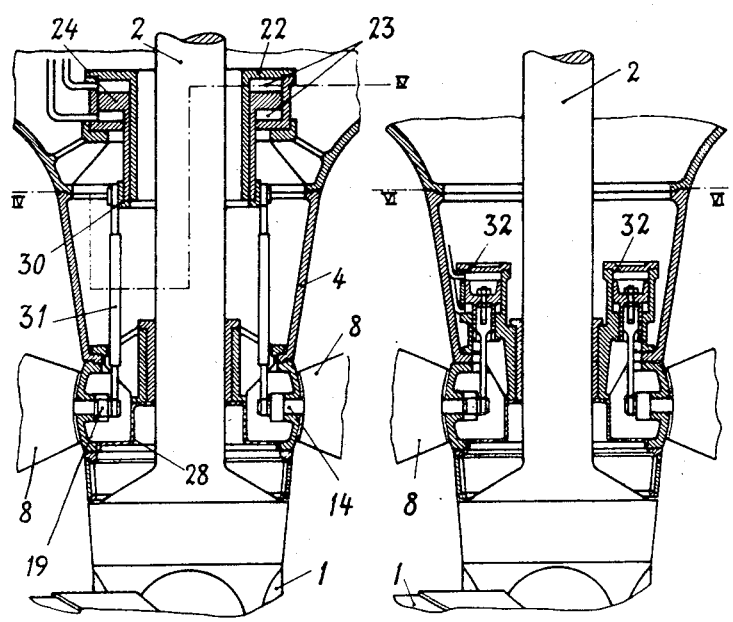
*Fig. 3.*     *Fig. 5.*
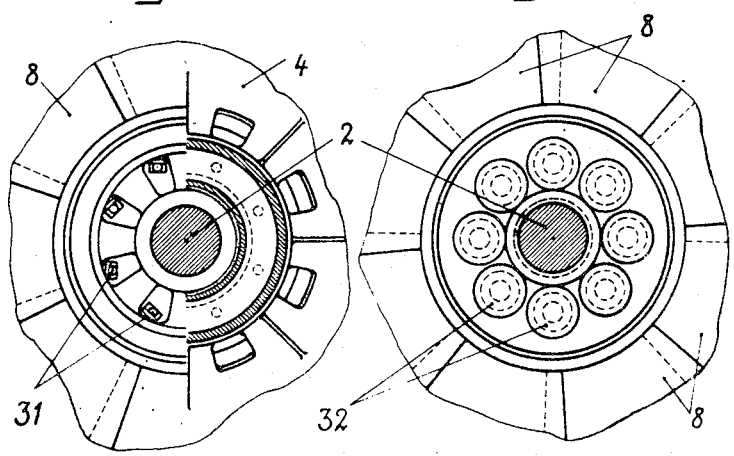
*Fig. 4.*     *Fig. 6.*
Inventor:
Oscar Emanuel Alm.
by: W. Bayard Jones
Attorney.

INVENTOR:
OSCAR EMANUEL ALM

Patented Nov. 4, 1952

2,616,663

UNITED STATES PATENT OFFICE 2,616,663

WATER TURBINE AND PROPELLER PUMP

Oscar Emanuel Alm, Karlstad, Sweden, assignor to Aktiebolaget Karlstads Mekaniska Werkstad, Karlstad, Sweden, a manufacturing company of Sweden Application June 8, 1946, Serial No. 675,405
In Sweden June 16, 1945

2 Claims. (Cl. 253—155)

The present invention relates to an improvement in water turbines, such as propeller turbines or Francis turbines, and propeller pumps of the kind in which the water flows through the turbine runner wheel, or through the pump wheel, respectively, in the axial direction but is admitted to the inlet of the machine at an angle to the shaft of the machine and thus suffers a considerable change of direction, usually about 90°, in the inlet, and which turbines or pumps are provided with a guide vane apparatus having rotatable guided vanes. In hydraulic machines of this kind as heretofore known, the guide vane apparatus is placed ahead of the bend in the machine inlet, and the axes of rotation of the guide vanes are parallel to the machine shaft. This location of the guide vane apparatus renders it necessary to provide the said apparatus with a large number of guide vanes and a corresponding large number of bearings for the vanes, a large number of cranks and links for turning the guide vanes, and moreover, with a supporting ring, an adjustment ring, a separate servomotor, and a transmission to the latter. In this way the guide vane apparatus becomes bulky and expensive and requires a large space, so that also the cost of the turbine plant becomes very great, particularly if the turbine plant is to be located in a chamber blasted into the rock, as is often the case. For this reason it has been necessary to endeavour to make the diameter of the guide wheel and thus also the extension in the horizontal direction of the inlet spiral as small as possible, and this aim has often been carried so far that the lower portions of the rotatable guide vanes project somewhat into the bend of the machine inlet, at least in certain positions of adjustment of said guide vanes. This arrangement, in its turn, entails the disadvantage, however, that the said lower portions of the guide vanes cause strong whirls or eddies in the water with resultant increased pitting or corrosion of the guide vanes and of the runner chamber, which in its turn impairs the efficiency of the turbine or pump.

It is the purpose of the present invention to obviate these difficulties or at least to reduce the same materially, and a further object is to provide a guide vane apparatus having rotatable guide vanes for turbines or pumps of the above-mentioned kind, which also provides great advantages in respect of the operation of the rotatable guide vanes as compared to the constructions heretofore practised. With these objects in view the invention is mainly characterized by the guide vane apparatus including the rotatable guide vanes therein being located after the bend of the machine inlet but ahead of the turbine runner wheel, or the pump wheel, respectively, taken in the direction of flow of the water, the guide vanes being rotatably journalled in the upper portion of the turbine chamber tube, or of the pump chamber tube, respectively, and also in a central guide wheel hub, in such manner that the axes of rotation of said guide vanes form angles with the machine shaft. By this arrangement the advantage is obtained that the number of guide vanes may be considerably reduced, and thus also the number of bearings for the rotatable guide vanes and the number of machine elements serving to effect rotation of said guide vanes, so that the cost of production of the guide vane apparatus is considerably reduced. Also, the entire operating mechanism for the guide vane apparatus becomes considerably simpler and less expensive, as it may be placed close to the machine shaft and may be made concentric with said shaft. The location of the guide vane wheel between the bend in the inlet and the runner wheel also provides the advantage that the flow of water becomes very smooth and free from whirls and eddies at all positions of adjustment of the rotatable guide vanes, so that the risk of cavitation and the undesirable results thereof are considerably reduced.

Figure 2:
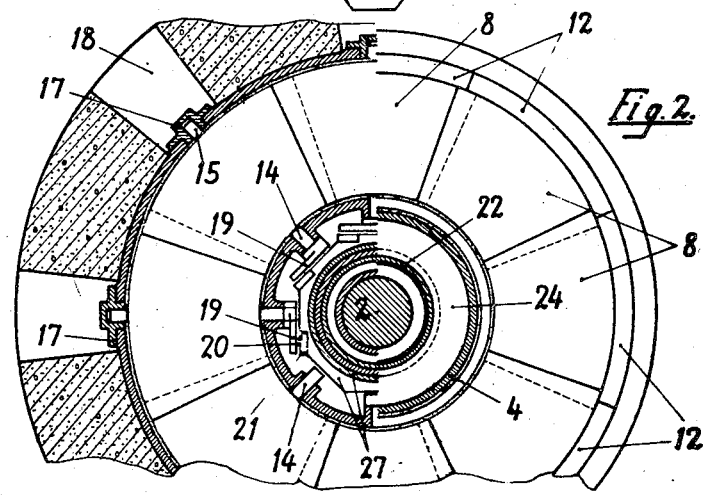
Figure 7:
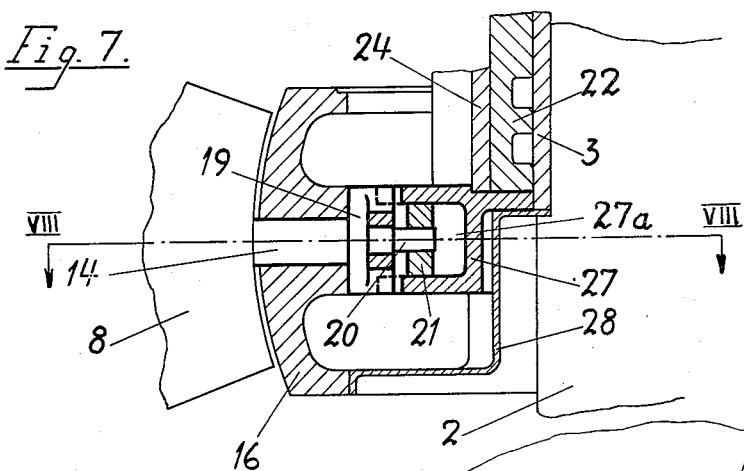
Figure 8:
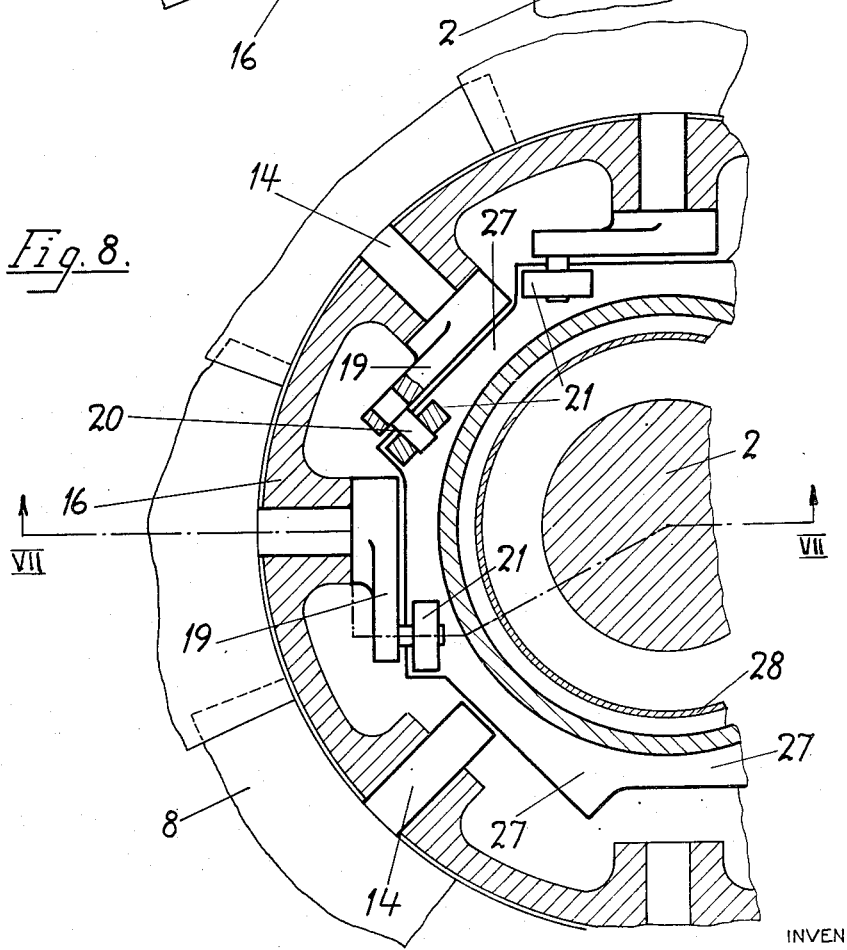

A few constructional forms of the invention are illustrated by way of example in the accompanying drawings. Fig. 1 is an axial section through a propeller turbine of the Kaplan type to which the present invention is applied, and Fig. 2 is a cross section through the same on the broken line II—II in Fig. 1. Figs. 3 and 4 illustrate in a similar manner a somewhat modified constructional form of the operating mechanism for the guide vane apparatus, and Figs. 5 and 6 show a third constructional form of said mechanism. Fig. 7 shows to a larger scale a fractional axial section through the central guide wheel hub of the turbine illustrated in Figs. 1 and 2, said section being taken on the line VII—VII in Fig. 8, which shows a horizontal fractional section of the guide wheel hub on the line VIII—VIII in Fig. 7.

In the constructional form illustrated in Figs. 1 and 2, 1 denotes the runner wheel, and 2 denotes the shaft thereof which is journalled by means of a guide bearing 3 in the turbine frame 4. The annular turbine inlet 5 which is in direct communication with the inlet chamber or inlet spiral, which is not illustrated in the drawing, passes through the bend 6 into the guide vane chamber 7 in which the guide wheel comprising the guide vanes 8 is placed. The guide vane chamber 7 communicates with the runner wheel chamber 9 which communicates with the suction tube 10. The guide vane chamber 7 and the runner chamber 9 constitute together the so-called turbine chamber. This chamber is surrounded by the turbine chamber tube which comprises an upper portion 11 which is provided with a lining 12, which may consist, for instance, of several segmental portions, and a lower portion 13.

In turbines of the type here concerned as heretofore used, the guide wheel is placed in the inlet 5 in such manner that the axes of rotation of the guide vanes are parallel to the turbine shaft 2. According to the invention, on the other hand, the guide wheel is placed after the bend 6, taken in the direction of flow of the water, so that the axes of rotation of the guide vanes 8 form right angles to the turbine shaft. Each guide vane 8 has a split shaft comprising two journals, viz. a long journal 14 and a short journal 15, by means of which it is journalled in the guide wheel hub 16 at one end and, at the other end, in a bearing 17 mounted in the upper portion of the turbine chamber, said bearing being accessible from the outside through an opening 18 in the concrete wall, for assembling and inspection. Secured to the inner guide vane journal 14 which is detachably connected to the vane, is a crank 19 having a crank pin 20 which engages a slide block 21. Through these slide blocks the guide vanes are connected to a servomotor serving to turn the vanes, said servomotor being arranged concentrically around the turbine shaft 2, according to the invention, and being in the instance illustrated built together with the guide bearing 3 to a unit which forms a portion of the frame 4. The guide bearing bushing 3 is carried by a bearing housing 22 which simultaneously forms a head of the servomotor cylinder 23 and a guide for the servomotor piston 24 which is movable in said cylinder. The pressure liquid used, for instance oil, is supplied from an oil pump, not shown, through conduits 25 and 26 to the chambers on the upper and lower sides, respectively, of the piston 24. Detachably secured to said piston is an entrainer in the shape of a ring 27 which is provided with a peripheral groove 27a, Fig. 7 serving to receive the above-mentioned slide blocks 21 on the crank pins 20. Below the guide bearing 3 and the inner guide vane bearings, the guide wheel hub 16 is closed by means of a collar 28 which jointly with the guide wheel hub forms a container for lubricant oil. A packing box or an oil bowl for the bearing may be provided in the space between the guide wheel hub and the runner wheel hub. The said space is accessible through openings in the frame 4 which may be closed by means of covers 29.

The guide wheel above described, and also the runner wheel may be completely assembled around the turbine shaft while above the turbine wall or chute, and may afterwards be lowered into place together with the frame and the runner wheel, or in the case of large turbines, immediately after the latter. It is for rendering this procedure possible that the shafts of the guide vanes 8 are split. The longer journal 14 which serves to journal the vane in the hub 16, extends nearly all the way through the guide vane and is detachably secured to the latter. The shorter journal 15 which serves to journal the vane in the outer bearing 17, is secured to the vane by means of a pin or the like. When the guide wheel has been lowered into place, the journals 15 are inserted in the vanes through the openings 18, after which the bearings 17 are mounted in place. For exchanging guide vanes that may have become damaged the bearings 17 are first removed and then the journals 15, after which the long journals 14 are pulled out which may be provided with suitable means for this purpose.

Regulation impulses are transmitted from the usual turbine governor by means of the oil or the pressure medium otherwise used, to the servomotor piston 24 which when displaced carries along the slide blocks 21 through the intermediary of the entrainer 27. The blocks in their turn actuate the crank pins 20 which produce turning movement of the guide vanes 8.

In order that the guide vanes 8 shall give a tight fit in their closing position, the outer edges thereof are shaped as circular arcs. If the wall 11 of the guide wheel chamber had a cylindrical inner surface, the said edges while in the open positions of the vanes would give undesirable opportunities for floating objects and other solid impurities in the water to collect, which would lower the efficiency and also obstruct the closing of the guide vanes. In order to obviate this difficulty, those portions of the wall 11 which are opposite the outer edges of the vanes, have a spherical shape. In consequence hereof, the concavity of the wall of the guide wheel chamber above the guide wheel, is made as a detachable liner 12 in the form of a whole ring, or a split ring, which thus supplements the lower spherical portions of the wall. By suitably shaping the upper edge of this liner ring, it may serve simultaneously as a water guide.

The constructional form illustrated in Figs. 3 and 4 differs from that above described mainly in that the servomotor 23, 24 which also in this case is arranged concentrically about the turbine shaft 2, is not built together with the guide bearing, but is placed at a higher level in the frame 4. For this reason the entrainer ring 27 in Figs. 1 and 2 is replaced by a ring 30 connected to the servomotor piston 24 and to which pull rods 31 are pivoted, said rods being connected to the crank pins of the cranks 19 on the inner guide vane journals 14. This constructional form is suitable for smaller turbines.

Finally, in the constructional form illustrated in Figs. 5 and 6 a plurality of servomotors 32 are provided in a circular row around the turbine shaft 2. In the instance illustrated, each guide vane 8 is assumed to be provided with a separate servomotor 32, but the arrangement can also be constructed in such manner that two adjacent guide vanes 8 are operated by means of a common servomotor. This constructional form is suitable for very large turbines.

The improvement according to the invention provides very great advantages. It is believed to be evident from the above description that the change of location of the guide wheel from the turbine inlet 5 ahead of the bend 6 to such a position after this bend where the water current has assumed its correct axial direction of flow, provides great advantages both from a constructional point of view and from a hydraulic point of view. If the old construction with the guide wheel placed in the inlet 5 were used in the turbine illustrated in Figs. 1 and 2, it would be necessary to employ a row of guide vanes having twenty-four guide vanes and a corresponding large number of bearings, cranks, and links, and moreover, also a supporting ring, an adjustment ring, a separate servomotor, and a transmission to the latter. In the same turbine constructed according to the present invention, on the other hand, there is only required one guide wheel having eight guide vanes and an equal number of short cranks, crank pins, and slide blocks, which parts are assembled with the servomotor. In this way the friction surfaces represented by these few bearings and connecting points are reduced to a fraction of the friction surfaces in the prior construction. All inner parts are located in an oil bath which also lubricates the guide vane shafts. The braces supporting the machine frame need no longer be constructed in connection with the guide vanes. The number of braces may be reduced, and the braces may also be shaped in a more advantageous manner from the point of view of mechanical strength, which results in a reduction of the hydraulic friction surfaces. A very great advantage resides also in the fact that the expensive inlet spiral may be given a considerably less extension in the horizontal direction. In this way the cost of material and manufacture are decreased, and the cost of rock blasting is reduced in the case when the turbine plant is to be located in a chamber in the rock. In addition, when two or more turbines of the type here concerned are to be placed beside one another, the distance between the units and thus also the building costs are reduced.

The constructional forms above described and illustrated in the drawings are only to be regarded as examples, and it will be understood that they may be further modified in respect of their details in various ways without departing from the principle of the invention. The invention may of course be applied also to such propeller pumps having a guide vane apparatus in which the pump wheel conveys the liquid to be pumped in such direction that the liquid passes first through the guide vane apparatus and then through the pump wheel, to be forced from the space 10 below the pump wheel up to a tank or reservoir located at a higher level.

I claim:

1. An axial flow water turbine, comprising in combination a tubular casing forming an axial flow passage for the water through the turbine, a frame located in part above said tubular casing and overhanging the same to define together with the upper part of said tubular casing an annular peripheral inlet for admitting water in a substantially radial direction from all points around the circumference of the turbine to said tubular casing, said frame having a central depending portion extending into said tubular casing and coaxial therewith, said depending portion of said frame defining a circumferential bend in said inlet diverting the incoming flow of water from a substantially radial direction through said inlet to a substantially axial direction through said tubular casing, a guide vane apparatus having rotatable guide vanes positioned in said tubular casing below the upper end thereof and below said inlet, a guide wheel hub in said depending portion of said frame within said tubular casing, shafts supporting said guide vanes and rotatably journalled in said guide wheel hub in such manner that the axes of rotation of said guide vanes form an angle to the axis of said tubular casing, a runner wheel positioned in said tubular casing below said guide vane apparatus, a shaft for said runner wheel rotatably journalled in said depending portion of said frame, at least one stationary servomotor for said guide wheel apparatus positioned in said depending portion of said frame external to said runner wheel shaft and concentric thereto, and operating means connecting said servomotor to said shafts of said guide vanes within said guide wheel hub.

2. An axial flow water turbine, comprising in combination a tubular casing forming an axial flow passage for the water through the turbine, a frame located in part above said tubular casing and overhanging the same to define together with the upper part of said tubular casing an annular peripheral inlet for admitting water in a substantially radial direction from all points around the circumference of the turbine to said tubular casing, said frame having a central depending portion extending into said tubular casing and coaxial therewith, said depending portion of said frame defining a circumferential bend in said inlet diverting the incoming flow of water from a substantially radial direction through said inlet to a substantially axial direction through said tubular casing, a guide vane apparatus having rotatable guide vanes positioned in said tubular casing below the upper end thereof and below said inlet, a guide wheel hub in said depending portion of said frame within said tubular casing, shafts supporting said guide vanes and rotatably journalled in said guide wheel hub in such manner that the axes of rotation of said guide vanes form an angle to the axis of said tubular casing, a runner wheel positioned in said tubular casing below said guide vane apparatus, a shaft for said runner wheel rotatably journalled in said depending portion of said frame, a stationary servomotor located in said depending portion of said frame external to said runner wheel shaft and concentric thereto, said servomotor comprising a cyclinder having an annular cross section and an annular piston in said cylinder, an entrainer ring connected to said servomotor piston and provided with a peripheral groove, cranks attached to said shafts of said guide vanes within said guide wheel hub, and crank pins on said cranks engaging said peripheral groove in said entrainer ring.

OSCAR EMANUEL ALM.

REFERENCES CITED

The following references are of record in the file of this patent:

UNITED STATES PATENTS

| Number | Name | Date |
|---|---|---|
| 1,510,436 | Englesson | Sept. 30, 1924 |
| 1,748,892 | Nagler | Feb. 25, 1930 |
| 1,945,071 | Popp | Jan. 30, 1934 |
| 1,950,775 | Biggs | Mar. 13, 1934 |
| 1,978,809 | Moody | Oct. 30, 1934 |
| 2,283,127 | Rheingans | May 12, 1942 |

FOREIGN PATENTS

| Number | Country | Date |
|---|---|---|
| 88,622 | Switzerland | Sept. 1, 1921 |